United States Patent [19]

Brown et al.

[11] 4,026,857

[45] May 31, 1977

[54] EPOXY EMULSION WATER-BASED COATING

[75] Inventors: George L. Brown, Scotch Plains; Carlos J. Martinez, Edison, both of N.J.

[73] Assignee: Mobil Oil Corporation, New York, N.Y.

[22] Filed: Aug. 1, 1975

[21] Appl. No.: 600,999

Related U.S. Application Data

[63] Continuation-in-part of Ser. No. 580,458, May 23, 1975, abandoned.

[52] U.S. Cl. .................. 260/29.4 R; 260/29.2 EP; 428/418; 428/460
[51] Int. Cl.$^2$ ........................................ C08G 51/24
[58] Field of Search ............... 260/29.2 EP, 29.4 R, 260/33.2 EP, 33.4 EP, 32.8 EP, 834

[56] References Cited

UNITED STATES PATENTS

| | | | |
|---|---|---|---|
| 3,446,764 | 5/1969 | Phillips et al. | 260/29.2 |
| 3,844,998 | 10/1974 | Jeffery et al. | 260/29.2 |

FOREIGN PATENTS OR APPLICATIONS

| | | | |
|---|---|---|---|
| 16,901 | 8/1965 | Japan | 260/29.2 |

*Primary Examiner*—Theodore E. Pertilla
*Attorney, Agent, or Firm*—Charles A. Huggett; Hastings S. Trigg

[57] ABSTRACT

A coating formulation comprises an oil-in-water emulsion of a solution of epoxy resin in an alkoxy alcohol, such as 2-hexoxyethanol (hexyl cellosolve) as the dispersed phase, a curing agent and a non-ionic surfactant. The emulsion is stable and has spreading and wetting properties over low energy and lubricated surfaces and aluminum, thus yielding films free from surface imperfections.

17 Claims, No Drawings

EPOXY EMULSION WATER-BASED COATING

CROSS-REFERENCE TO RELATED APPLICATIONS

This application is a continuation-in-part of copending application Ser. No. 580,458, filed May 23, 1975, now abandoned.

BACKGROUND OF THE INVENTION

1. Field of the Invention

This invention is concerned with epoxy emulsion coatings, particularly for low energy and lubricated surfaces.

2. Description of the Prior Art

Insofar as is now known, it has not been proposed to provide epoxy emulsion coating formulations using selective organic solvents to provide emulsion stability and surface tension depressant properties required to properly coat low energy surfaces and lubricated surfaces.

SUMMARY OF THE INVENTION

This invention provides an oil-in-water emulsion coating formulation of a solution of epoxy resin having an epoxy equivalent weight between about 400 and about 6,000 in a solvent having the formula $ROCH_2CH_2OH$ where R is $C_5$–$C_7$ alkyl, a non-ionic surfactant, and a curing agent.

It also provides low energy metal substrates, lubricated metal substrates and aluminum substrates coated with said epoxy emulsion coating formulations.

DESCRIPTION OF SPECIFIC EMBODIMENTS

The components in the emulsion formulations of this invention are epoxy resin, a solvent having the formula $ROCH_2CH_2OH$ where R is $C_5$–$C_7$ alkyl, or mixtures of such alkoxyethanol and a co-solvent, such as methyl ethyl ketone, containing at least 50 weight per cent alkoxyethanol, non-ionic surfactant, curing agent, and, optionally, a catalyst for cross-linking.

The epoxy resin can be any polyglycidyl ether of polyhydric organic compounds, especially polyhydric phenols. Particularly preferred are the glycidyl ethers of bisphenols, a class of compounds which are constituted by a pair of phenolic groups linked through an intervening aliphatic bridge. While any of the bisphenols can be used, the compound 2,2-bis-(p-hydroxyphenyl)-propane, commonly known as bisphenol A, is more widely available in commerce and is preferred. While polyglycidyl ethers can be used, diglycidyl ethers are preferred. The most preferred and commercially available epoxy resins are diglycidyl ethers of bisphenol A. Depending upon the degree of polymerization, the epoxy resins will have an epoxy equivalent weight of between about 400 and about 6,000. It is also within the contemplation of this invention to use a mixture of two or more epoxy resins in the emulsion coating formulations of this invention, provided each has an epoxy equivalent weight falling within the range of about 400 to about 6,000.

The organic solvent for the epoxy resin has been found to be an important factor with regard to emulsion properties and to film properties on low energy surfaces and lubricated surfaces. In order to achieve these properties, it appears that the solvent should have low solubility (less than about one weight per cent) in water. 2-Hexoxyethanol (hexyl Cellosolve) was found to afford both good emulsion and wetting properties. This will be apparent from the following example. Throughout this specification and claims all parts are parts by weight.

EXAMPLE 1

A series of emulsions were prepared using 100 parts of an epoxy resin (diglycidylether of bisphenol A) having an epoxy equivalent weight of 2,000-2,500, 50 parts of a solvent, 14 parts of surfactant having the formula

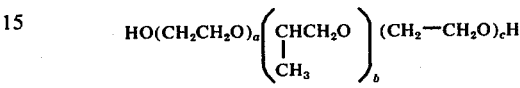

wherein $a + c$ is about 190–200, $b$ is about 60–70, and average molecular weight is about 12,500, and 150 parts of deionized water. In each emulsion a different solvent was used. Each emulsion, as well as other emulsions whose formulations are described in this specification, was prepared using the following general procedure:

The epoxy resin was dissolved in the solvent by heating at 130° C. with agitation. The resin solution was then cooled to about 65° C. and placed in high speed dispersing equipment. The surfactant was added. (In formulations wherein the emulsion coating was to be baked, cross-linking catalyst and curing agent, as defined hereinafter, were also added at this point.) Part of the water (about 100 parts) was then slowly added under high speed agitation (approximately 2,000 ft./min. peripheral speed) to pass the inversion point. Thereupon the agitation speed was slowed down to about 1,000 ft./min. and the balance of the water was added.

In each emulsion, a different organic solvent was used. In the cases of diisobutyl ketone and of diethylene glycol monophenyl ether an emulsion could not be formed. Each emulsion formed was applied, by wire wound bar application, to a test panel of lubricated electrolytic tinplated steel. Each applied wet film was observed for wetting characteristics. If the film is continuous without breaks, it is rated as "wetted". If, however, the film is discontinuous with breaks in it, it is rated as "dewetted". The wet film wetting characteristics obtained with each emulsion, the solvent used in each and the solubility of each solvent are set forth in Table I.

TABLE I

| Solvent | Solubility, wt. % Solvent in $H_2O$ | $H_2O$ in Solvent | Film Wetting Characteristic |
| --- | --- | --- | --- |
| Methyl Cellosolve* | ∞ | ∞ | Dewetted |
| Ethyl Cellosolve | ∞ | ∞ | Dewetted |
| Butyl Cellosolve | ∞ | ∞ | Dewetted |
| Hexyl Cellosolve | 0.99 | 18.8 | Wetted |
| Methyl ethyl ketone | 26.8 | 11.8 | Dewetted |
| Ethyl amyl ketone | 0.26 | 0.90 | Dewetted |
| Hexyl Carbitol* | 1.7 | 56.3 | Wetted** |

*Cellosolve and Carbitol are registered Trademarks of Union Carbide Co.
**Gave poor adhesion (20–30% failure)

In Table I, the Cellosolves have the formula $ROCH_2CH_2OH$, in which R denotes the designated alkyl substituent. Hexyl Carbitol is diethylene glycol monohexyl ether. It will be noted that only hexyl cellosolve, of all the solvents tested gave an emulsion with good film application wetting characteristics. It is significant to note the solubility properties of the solvents. It is contemplated that any solvent for the epoxy resin is utilizable in the emulsion coating formulations of this invention, provided it has low water solubility, preferably less than one weight per cent, and its hydrophobic-hydrophilic structure possesses surface active properties which aid in the preparation of stable emulsions and provides low interfacial tension required for wetting of lubricated and low energy surfaces. The solvents utilizable herein are alkoxyethanols that have the formula $ROCH_2CH_2OH$, wherein R is $C_5$–$C_7$ alkyl, preferably 2-hexoxyethanol.

It has also been found that mixtures of alkoxyethanol with other solvents are utilizable, even though the other solvent alone will not form an emulsion with good wetting characteristics. Such other solvents include alcohols, ketones, and Carbitols. Such mixtures, however, should contain at least 50 weight per cent alkoxyethanol. A preferred combination is 2-hexoxyethanol and methyl ethyl ketone.

The amount of solvent or solvent mixture to be used can vary over a wide range, dependent in part on the molecular weight of the epoxy resin and on the thickness of film desired. Relatively small amounts of solvent will be required for the lower molecular weight epoxy resins, while larger amounts of solvent will be used for higher molecular weight epoxy resins. If it is desired to lay down a thinner film at a given application rate, larger amounts of solvent are used. In general the amount of solvent or mixture of solvents used will be between about 25 parts and about 160 parts per 100 parts of epoxy resin.

The surfactants used in the emulsions of this invention are non-ionic surface active agents. These surfactants are well known in the art and are readily available commercially. Typical non-ionic surfactants include polyoxyethylene or polyoxypropylene ethers of higher fatty alcohols and alkyl phenols; fatty acid esters of polyglycols and of anhydrosorbitols; and etherified fatty acid esters of anhydrosorbitols. A preferred class of non-ionic surfactants are the polyoxyethylene ethers of polypropylene glycols having the structure

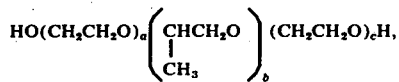

having an average molecular weight between about 10,000 and about 14,000.

The curing agent can be any conventional curing agent that will not adversely affect the emulsion stability. Typical curing agents include acids, such as novolacs, dibasic carboxylic acids, carboxyl phthalocyanines, and dimer and trimer fatty acids; anhydrides of aliphatic and aromatic polycarboxylic acids; acrylics, such as polyacrylates, polymethacrylates, and polyacrylamides; and amides and miscellaneous nitrogen compounds, such as dicyandiamide and hydrazides. The various curing agents used with epoxy resins are discussed in Lee and Neville's "Handbook of Epoxy Resins" McGraw-Hill (1967).

The preferred material used to thermoset the coating is conventional aminoplast cross-linking agent. Such agents are well known in the art. There can be used any of the thermosetting alkylated aminoplast resins, such as the urea-aldehyde resins, the melamine-aldehyde resins, the dicyandiamide-aldehyde resins and other aminoplast-aldehyde resins such as those triazine resins produced by the reaction of an aldehyde with formoguanamine, ameline, 2-chloro-4,6-diamino-1,3,5-triazine, 2-phenyl-p-oxy-4, 6-diamino-1,3,5-triazine, 6-methyl-2, 4-diamino-1,3,5-triazine; 2,4,6-trihydrazine-1,3,5-triazine, and 2,4,6-triethyl-triamino-1,3,5-triazine. The mono-, di-, or triaryl or mono-, di-, or tri-aryl melamines, for instance, 2,4,6-triphenyl-triamino-1,3,5-triazine can be used. Also utilizable are benzoguanamine and hexamethoxymethyl melamine. As aldehydes used to react with the amino compound to form the resinous material, one may use such aldehydes as formaldehyde, acetaldehyde, crotonic aldehyde, acrolein, or compounds which engender aldehydes, such as hexamethylenetetramine, paraldehyde, paraformaldehyde, and the like. It is preferred to use an aminoplast that is poorly water soluble.

Although not essential, it is preferable to use an acid cross-linking catalyst. Suitable catalysts include acid phosphates, such as methyl acid phosphate and butyl acid phosphate; acid pyrophosphates, such as dimethyl acid pyrophosphate; organic acid sulfate esters; and organic sulfonic acids, such as p-toluene-sulphonic acid. Preferred catalysts are the acid phosphate and the acid sulfate esters of alkylphenoxypoly(ethyleneoxy)-ethanol that are known as anionic surfactants. The acid catalysts can be used for instance, in the form of amine or ammonium salts.

The epoxy resin emulsion coating formulations of this invention have the following composition, all parts being expressed as parts by weight:

| Component | Parts |
| --- | --- |
| Epoxy Resin | 100 |
| Solvent (alkoxy-ethanol-containing) | 25 – 160 |
| Non-ionic surfactant | 2 – 15 |
| Acid catalyst | 0 – 2 |
| Curing agent | 1 – 30 |
| Water | 140 – 300 |

The epoxy emulsion coating formulations of this invention are particularly adapted for coating metal substrates having low energy metal surfaces and lubricated metal surfaces such as aluminum, steel, and tin-plated steel. The rate of application will be sufficient to apply the coating at about 1–20 mg./sq.in. Any of the usual methods can be used, including wiping, spraying, and roll coat application. After application the coating is set by baking at about 250° to about 500° F. for between about 30 minutes and about one minute.

In the following examples, the following components were used.

<u>Epoxy Resin</u>
A*  2,000–2,500 epoxy equivalent weight
B*  450–550 epoxy equivalent weight
C*  2,500–4,000 epoxy equivalent weight
*Diglycidyl ether of bisphenol A
<u>Surfactant</u>

-continued

D

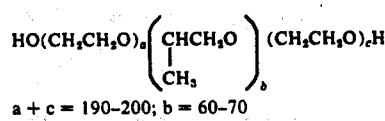

a + c = 190–200; b = 60–70

Catalyst
E    Nonyl($C_6H_4$) ($OCH_2CH_2$)$_4OSO_3NH_4$
F    Acid phosphate ester of nonyl-
phenoxy polyoxyethylene having
45–55 polyoxyethylene units per
unit of nonyl phenol.

Curing Agent
G    Hexamethoxymethylmelamine
H    Mixed methoxy- and butoxy-methyl-
melamine
I    Butylated urea-formaldehyde resin.
Flash, open cup, >180° F. Specific
gravity 1.086.
J    Butylated Benzoguanamine-formaldehyde
K    Polymeric urea, 60% solids Using the general procedure described in Example 1, epoxy emulsion coating formulations were prepared in accordance with this invention. These are set forth in Table II as Examples 2 through 9 and used combinations of the aforedescribed components. In Table II, the amount of each component is given in parts by weight. A dash (-) indicates that the component was not used in the formulation involved.

TABLE II

| Component | \multicolumn{8}{c}{Example Number} | | | | | | | |
|---|---|---|---|---|---|---|---|---|
| | 2 | 3 | 4 | 5 | 6 | 7 | 8 | 9 |
| Epoxy Resin A | 100 | 100 | 100 | 81.5 | — | 100 | 100 | 100 |
| Epoxy Resin B | — | — | — | 18.5 | — | — | — | — |
| Epoxy Resin C | — | — | — | — | 100 | — | — | — |
| 2-Hexoxyethanol | 45 | 45 | 45 | 48.2 | 60 | 45 | 45 | 45 |
| n-Butanol | — | — | — | 3.67 | — | — | — | — |
| Surfactant D | 3 | 3 | 3 | 2.22 | 2.22 | 10 | 3 | 3 |
| Catalyst E | — | — | — | 0.74 | 0.74 | — | — | — |
| Catalyst F | 3 | 3 | 3 | — | — | 3 | 3 | 3 |
| Curing Agent G | — | — | — | 2.22 | — | — | — | — |
| Curing Agent H | 10 | 5 | — | 5.93 | — | 10 | — | — |
| Curing Agent I | — | 5 | 10 | — | 10 | — | — | — |
| Curing Agent J | — | — | — | — | — | — | 30 | — |
| Curing Agent K | — | — | — | — | — | — | — | 33.3 |
| Deionized $H_2O$ | 200 | 200 | 200 | 207.41 | 270 | 200 | 200 | 200 |

Panels of tinplated steel (0.01 inch thickness) were coated by wire wound bar application, each with one of the coating formulations of Examples 2 through 9. Each coated panel was cured by baking for 5 minutes at 350° F. except Examples 8 and 9 which were baked 4 minutes at 350° F. After cooling, the coated panels (dry film thickness 0.1–0.2 mil) were subjected to the following tests:

MEK Double Rubs

A pad of felt (2 inches square) soaked in MEK(methylethyl ketone) is rubbed back and forth across the coated surface, while the panel is resting on a firm surface. Each stroke is 2½–3 inches in length at a uniform pressure of about 900 grams and at a rate of about 100 rubs per minute. The pad is re-soaked with MEK after 50 double rubs, or before, if increase in friction makes it necessary. One double rub is considered as one back and forth stroke. The test is stopped when approximately 10% of the metal is exposed on the area being rubbed.

Fabrication 180° Bend (4T Bend)

The panel is manually bent into a U-shape. A number of thicknesses of the substrate (in this case, 4 thicknesses or 4T) are placed in the bend area and the entire assembly is placed in the jaws of a press and pressed. Scotch tape is applied across the bend and removed quickly. The adhesion of the coating fiber after bending is rated on a scale of 0 to 10 with 10 representing perfect, i.e., no coating was pulled off with the tape.

Pasteurized Adhesion (Past. Adh.)

Pasteurization is carried out by immersing the coated panel in water at 170° F. for 45 minutes. Then, the panel is wiped dry with an absorbent towel and a coated area of the panel is cross-hatched with individual score lines approximately 1/16 inch apart. Scotch tape is firmly applied to the cross-hatched area and removed with a quick snap. Adhesion is rated on a scale of 0 to 10 with 10 representing perfect, i.e., no coating was pulled off with the tape. Blush, i.e., clouding of the film is rated on a 0 to 10 scale with 10 representing no blush.

The test results on the coatings of Examples 2 through 9 are set forth in Table III.

TABLE III

| Test | \multicolumn{8}{c}{Example Number} | | | | | | | |
|---|---|---|---|---|---|---|---|---|
| | 2 | 3 | 4 | 5 | 6 | 7 | 8 | 9 |
| MEK Double Rubs | >100 | 90 | 30 | 50 | 100 | 84 | 70 | 200 |
| 4T Bend | 10 | 10 | — | — | — | 10 | — | — |
| Pasteurization: | | | | | | | | |
| Past Adh. | 10 | 10 | 10 | 10 | 10 | 10 | 10 | 10 |
| Blush | 9+ | 9 | 4 | 10 | 9 | 9 | 9 | 9+ |

It will be noted from the data in Table III that the epoxy emulsion coating formulations of this invention provide excellent coatings for low energy surfaces and lubricated surfaces. In the case of Examples 2 and 7, similar excellent results were attained in tests on sprayed cans.

In Example 1, it was indicated that the epoxy resin was dissolved in the solvent (hexyl Cellosolve) by heating at 130° C. As will be apparent, the temperature at which the solution is made is not a critical factor. The use of higher temperatures primarily serves to shorten solution time. In commercial practice, high temperatures are not practical, because condensers are not required to prevent solvent loss and energy is wasted in reaching higher temperatures and then cooling back to the temperature at which the emulsion is made. In general, temperatures in the order of about 50°–140° C. can be used. The following example demonstrates the operation at lower temperatures.

EXAMPLE 10

An emulsion coating formulation was prepared using the following components:

| Component | Parts |
| --- | --- |
| Epoxy Resin A | 100 |
| 2-Hexoxyethanol | 56.6 |
| Surfactant D | 9.2 |
| Curing Agent I/L*(2:1) | 17.6 |
| Deionized H$_2$O | 140.0 |
| Deionized H$_2$O | 5.9 |
| Catalyst E | 0.7 |

*Curing Agent L is butylated melamine-formaldehyde resin, 50% solids.

The epoxy resin was dissolved in the 2-hexoxyethanol solvent by heating to 77° C. with agitation. The resin solution was cooled to 60°–66° C. and the surfactant and curing agents added. The temperature dropped to 49°–54° C. Part of the water (~ 60 parts) was added at a rate equal to 1–1.5% of the total water charge per minute (1.5–2.2 parts/min.) under high speed agitation (peripheral speed of 3000 ± 500 feet/min.) to pass the inversion point. The agitation is slowed to about 1000 feet/min. and an additional 80 parts of water added. The catalyst was premixed with the remaining water and added, under agitation, and stirred until uniform.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:
1. An oil-in-water emulsion coating formulation containing in parts by weight:
   a. 100 parts of epoxy resin having an epoxy equivalent weight between about 400 and about 6,000 or of a mixture of two or more epoxy resins each having an epoxy equivalent weight falling within the range of between about 400 and 6,000;
   b. about 25 to 160 parts of an alkoxyethanol solvent having the formula ROCH$_2$CH$_2$OH, wherein R is C$_5$–C$_7$ alkyl or a mixture of said alkoxyethanol and a co-solvent, selected from the group consisting of alcohols, ketones, and carbitols containing at least about 50 weight per cent alkoxyethanol;
   c. about 2–15 parts non-ionic surfactant;
   d. about 0 to 2 parts of an acid cross-linking catalyst;
   e. about 1 to 30 parts of a conventional curing agent for an epoxy resin; and
   f. about 140 to 300 parts of water.
2. The formulation of claim 1, wherein said solvent is 2-hexoxyethanol.
3. The formulation of claim 2, wherein said epoxy resin is a diglycidyl ether of bisphenol A.
4. The formulation of claim 3, wherein said surfactant has the structure

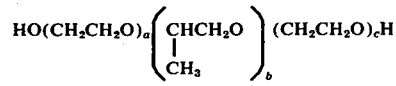

and has an average molecular weight between about 10,000 and about 14,000.
5. The formulation of claim 4, wherein said curing agent is an aminoplast.
6. The formulation of claim 4, wherein said epoxy resin has an epoxy equivalent weight of 2,000–2,500; said surfactant a+c is 190–200; said catalyst is an acid phosphate ester of nonylphenoxy polyoxyethylene having 45–55 polyoxyethylene units per unit of nonylphenol and said curing agent is mixed methoxy- and butoxy-methylmelamine.
7. The formulation of claim 6, wherein said curing agent is a mixture of butylated urea-formaldehyde resin and mixed methoxy- and butoxy-methylmelamine.
8. The formulation of claim 1, wherein said epoxy resin is a mixture of diglycidyl ether of bisphenol A having an epoxy equivalent weight of 2,000–2,500 and a diglycidyl ether of bisphenol A having an epoxy equivalent weight of 450–550; said solvent is a mixture of 2-hexoxyethanol and n-butanol containing 93 weight per cent 2-hexoxyethanol; said surfactant has the structure

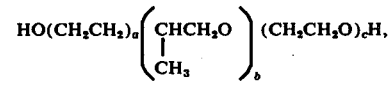

wherein a+c is 190–200 and b is 60–70; said catalyst has the structure C$_9$H$_{19}$(C$_6$H$_4$)(OCH$_2$CH$_2$)$_4$ OSO$_3$NH$_4$; and said curing agent is a mixture of hexamethoxymelamine and mixed methoxy- and butoxy-methylmelamine.
9. The formulation of claim 1, wherein said epoxy resin is a diglycidyl ether of bisphenol A having an epoxy equivalent weight of 2,500–4,000; said solvent is 2-hexoxyethanol; said surfactant has the structure

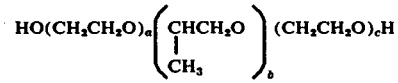

wherein a+c is 190–200 and b is 60–70; said catalyst has the structure C$_9$H$_{19}$(C$_6$H$_4$)(OCH$_2$CH$_2$)$_4$OSO$_3$NH$_4$; and said curing agent is butylated urea-formaldehyde resin.
10. The formulation of claim 6, wherein said curing agent is polymeric urea.
11. A metal substrate coated with the formulation of claim 1 and baked.
12. A metal substrate coated with the formulation of claim 3 and baked.
13. A metal substrate coated with the formulation of claim 6 and baked.
14. A metal substrate coated with the formulation of claim 7 and baked.
15. A metal substrate coated with the formulation of claim 8 and baked.
16. A metal substrate coated with the formulation of claim 9 and baked.
17. A metal substrate coated with the formulation of claim 10 and baked.

* * * * *